March 3, 1936.  J. P. GATY  2,032,874
FILTER UNIT FOR CAMERAS
Filed Dec. 11, 1934
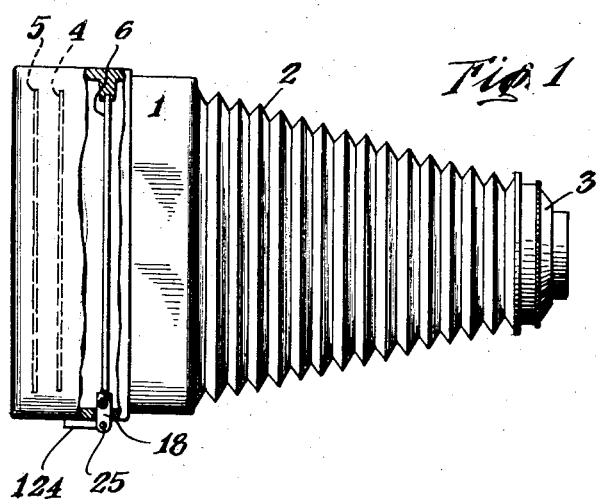
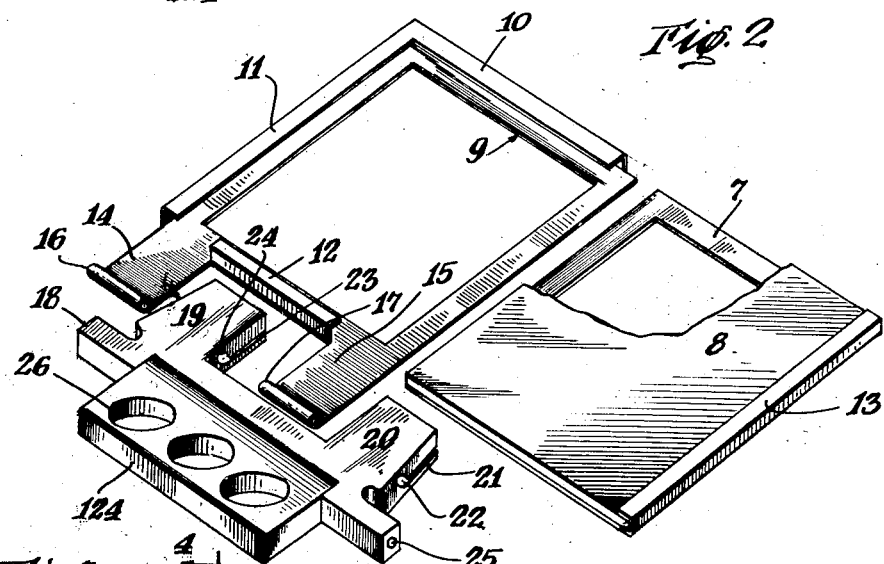
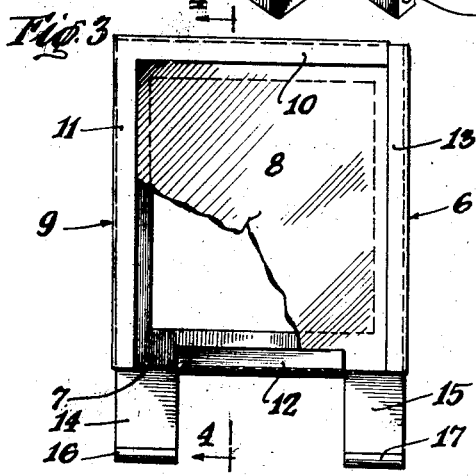
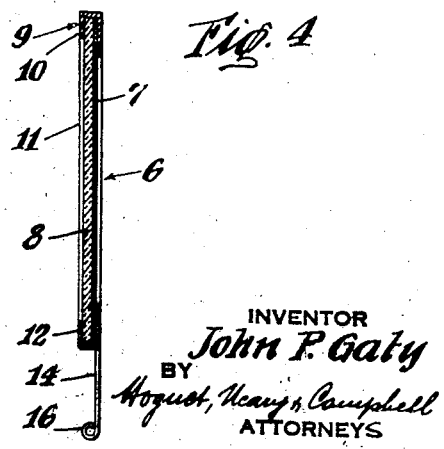
INVENTOR
John P. Gaty
BY
Hoguet, Neary & Campbell
ATTORNEYS Patented Mar. 3, 1936

2,032,874

UNITED STATES PATENT OFFICE 2,032,874

FILTER UNIT FOR CAMERAS

John P. Gaty, Woodside, N. Y., assignor to Fairchild Aerial Camera Corporation, Woodside, N. Y., a corporation of New York Application December 11, 1934, Serial No. 756,930

10 Claims. (Cl. 95—81.5)

This invention relates in general to cameras and their accessories and has for one of its objects to provide an improved filter carrying frame.

Heretofore, little or no attention has been given to the item of convenience in connection with the use of photographic filters. Ordinarily, glass or gelatine filters are mounted in metal cells and attached to the front of the lens. This method is productive of considerable accidental damage, especially to the delicate gelatine filters. Sometimes gelatine filter discs are inserted between the elements of the lens in a semi-permanent manner. This method creates great difficulty in changing from one filter to another having a different density. Both methods are unsatisfactory for use on cameras equipped with interchangeable lenses, since a change of lens in most cases involves a change of filter, inasmuch as the lenses usually vary in size and a filter cell adapted to fit one lens ordinarily will not accurately fit another lens of different focal length. Good glass filters, having optically flat surfaces, are expensive and since a plurality of interchangeable lenses will require a plurality of these expensive filters, the total cost of filter equipment becomes excessive, especially when a wide range of densities and colors are required. If gelatine filters are used in cells adapted for attachment to the front of the lens, rapid deterioration occurs, due to exposure of the filter to dust, moisture and casual damage.

It is the object of this invention to provide a filter arrangement that will eliminate the difficulties mentioned above; provide convenience in changing lenses without the necessity of changing filters; eliminate the exposure of the filters to dust, moisture and casual damage; and provide ready interchangeability when required. Moreover, these objects are realized in a very economical manner, since only one set of inexpensive gelatine or glass filters, together with the necessary metal frames are all that are required for a plurality of lenses.

Furthermore, the location of the filters, quite near the film or plate surface, is conducive to elimination of image distortion caused by the departure of the filter surfaces from true optical flatness. It therefore follows that less expensively surfaced glass filters or gelatine filters can be used, if desired, without noticeable deterioration of the image quality.

Moreover, if glass filter plates are used, a clear glass dummy plate should be inserted when no filter effect is desired, for cameras using mechanical focussing means such as range finders or focussing scales, otherwise the introduction and removal of the filter will affect the location of the focal plane of the lens.

It is also the object of this invention to arrange the filter in the proper relationship to the shutter so as to allow the removal of the filter without special precautions against light leakage.

It is another object to provide a suitable carrier and handle adapted to firmly hold a separable frame carrying an interchangeable filter.

It is another object of the invention to provide a filter carrying unit to include a frame that will be readily separable to receive interchangeable filters and a frame carrying holder having a convenient handle and a provision for receiving interchangeable frames and to provide a guide frame for the sides of the filter frame for making the unit readily insertable and removable and to seal off all light passing outside the edge of the filter frame.

It is a further object to so construct the filter carrying unit that it may carry a filter gelatine rectangle as large as the picture area.

With the foregoing and other objects in view, the invention resides in the combination of parts and in the details of construction hereinafter set forth in the following specification and appended claims, certain embodiments thereof being illustrated in the accompanying drawing, in which:

Figure 1 is a diagrammatical illustration of a view in elevation of a bellows focal plane shutter camera with the filter unit installed;

Figure 2 is a view in perspective partly broken away of the filter, the frame and the frame holder and handle, the parts of the unit being disassembled;

Figure 3 is a top plan view partly broken away of the filter and frame;

Figure 4 is a view in section taken along line 4—4 of Figure 3.

Referring more particularly to the drawing, the type of camera, shown for sake of example, includes a body 1, a bellows 2, a lens 3, a focal plane shutter 4 and film 5. By reference to Figure 1 it will be noted that the filter unit, generally indicated at 6, is arranged in front of the focal plane shutter 4. The unit may thus be removed without the necessity of special precautions against light leakage and consequent undesired exposure of film.

The frame may be made in two parts. As shown in Figure 2, the part 7 actually carries the gelatine filter 8. The other part 9 of the frame is provided with upstanding guide portions 10, 11 and 12 to removably receive part 7 which is also provided with an upstanding guide portion 13. The area bounded by the substantially rectangular frames 7 and 9 is the same and is equal to the picture area as is the gelatine filter carried by the frame.

The frame 9 is provided with two spaced extensions 14 and 15 terminating in rolled beads 16 and 17. The carrier 18 is provided with two forks 19 and 20 spaced the same distance from each other as the extensions 14 and 15. These forks are provided with grooves. The groove in fork 20 has a narrow portion 21 slightly greater than the thickness of extension 15 and a circular portion 22 to receive the bead 17. The fork 19 has a corresponding groove with a flat part 23 and a circular portion 24 to receive the extension 14 and its bead 16. Thus, the first step in assembly is to slide the filter frame 7 into frame 9 as shown in Figure 3. The composite frame is then releasably connected to the carrier 18 by engaging the forks 19 and 20 with the extensions 14 and 15 of the frame. The frame and carrier are then slid into a place provided for them in the camera until the frame rests in a suitable groove in member 1 of the camera. The upturned portions 10, 11, 12 and 13 act as guide members to seal off all light from passing outside the edge of the filter frame.

As shown in Figures 1 and 2 the filter frame carrier 18 is recessed to receive a folding handle 124 pivotally movable about pin 25 and provided with finger engaging holes 26. The handle may be folded over flat, as shown in Figure 1, so that it lies flat on the camera when the filter is in place.

Thus there has been provided a three part unitary device comprising a removably and conveniently assembled device, comprising a holder and handle and a frame to retain the filter gelatine which may be as large as the picture area. It has also been provided with a filter holder unit which is placed in front of the focal plane shutter so as to permit removal without the necessity of special precautions against light leakage. There has also been provided a carrier and handle equipped to firmly hold a separable frame carrying a gelatine filter which is changeable when desired. There has also been provided a guide frame for sides of the filter, sealing off all light from passing outside the edge of the filter frame.

I claim:

1. In combination in a camera, a photographic filter carrying unit including a frame for carrying the filter, a holder for releasably carrying the frame and a handle secured to said holder, the upper and lower surfaces of the edges of said frame and holder being flush with each other when assembled so as to provide guide members, said camera being provided with a transverse slot to provide a cooperating guideway for said guide members.

2. In combination a camera, a photographic filter carrying unit including a frame for carrying the filter and a holder for releasably carrying the frame, the upper and lower surfaces of the edges of said frame and holder being flush with each other when assembled so as to provide guide members, said camera being provided with a transverse slot to provide a cooperating guideway for said guide members.

3. In combination in a camera, a photographic filter carrying unit including a frame for carrying the filter, a holder for releasably carrying the frame, said holder being provided with flanges at its edges to receive and position said frame, said frame being provided with a flange of equal dimensions with those of said holder, the flanges of said holder and frame having their surfaces flush with each other when said frame and holder are assembled so as to provide guide members, said camera being provided with a transverse slot to receive and guide said guide members in light-tight relationship.

4. In combination in a camera, a photographic filter carrying unit including a frame for carrying the filter, a holder for releasably carrying the frame, said frame being provided with flanges at its edges to receive and position said frame, said frame being provided with a flange of equal dimensions with those of said holder, the flanges of said holder and frame having their surfaces flush with each other when said frame and holder are assembled so as to provide guide members, said camera being provided with a transverse slot to receive and guide said guide members in light-tight relationship, said frame being interchangeable with respect to said holder.

5. In combination in a camera, a photographic filter carrying unit including a frame for carrying the filter, a holder for releasably carrying the frame and a handle secured to said holder, the upper and lower surfaces of the edges of said frame and holder being flush with each other when assembled so as to provide guide members, said camera being provided with a transverse slot to receive and guide said guide members in light-tight relationship, said handle being transversely slidably attachable to and removable from said holder.

6. In combination in a camera, a photographic filter carrying unit including a frame for carrying the filter, a holder for releasably carrying the frame and a handle secured to said holder, the upper and lower surfaces of the edges of said frame and holder being flush with each other when assembled so as to provide guide members, said camera being provided with a transverse slot to receive and guide said guide members in light-tight relationship, said handle being transversely slidably attachable to and removable from said holder, said frame, holder and handle being interchangeable with respect to each other.

7. In combination in a camera, a filter carrying unit including a holder for carrying the filter and a handle therefor, means for releasably securing said handle to said holder so as to provide for the interchangeability of said holder and said handle, said means comprising spaced extensions on said holder cooperating with corresponding extensions of said handle and having grooves adapted to slidably engage the extensions of said holder.

8. In combination in a camera, a photographic filter carrying unit including a frame for carrying the filter, a holder for releasably carrying the frame and a handle secured to said holder, means for effecting a slidable engagement of said holder and said frame, said means also providing guide members when in assembled position, said camera being provided with a transverse slot to provide a cooperating guideway for said guide members.

9. In combination in a camera, a photographic filter carrying unit including a frame for carrying the filter, a holder for releasably carrying the frame, means for effecting a slidable engagement of said holder and said frame in light tight relationship, said means also providing guide members when in assembled position, said camera being provided with a transverse slot to provide a cooperating guideway for said guide members.

10. In combination in a camera, a photographic filter carrying unit including a holder for carrying the filter means for effecting a slidable engagement of said holder and said filter, said means also providing guide members, said camera being provided with a transverse slot to receive and guide said guide members.

JOHN P. GATY.